United States Patent
Fukushima et al.

(10) Patent No.: US 6,765,643 B2
(45) Date of Patent: Jul. 20, 2004

(54) LIQUID CRYSTAL DISPLAY ELEMENT

(75) Inventors: Rieko Fukushima, Yokohama (JP); Kohki Takatoh, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/739,975

(22) Filed: Dec. 20, 2000

(65) Prior Publication Data

US 2001/0005248 A1 Jun. 28, 2001

(30) Foreign Application Priority Data

Dec. 27, 1999 (JP) .......................................... 11-369363

(51) Int. Cl.[7] .............................................. C09K 19/02
(52) U.S. Cl. ...................................... 349/174; 349/123
(58) Field of Search ................................ 349/174, 123, 349/172

(56) References Cited

U.S. PATENT DOCUMENTS 5,686,019 A * 11/1997 Nakamura ............... 252/299.01
5,936,689 A * 8/1999 Saishu et al. ................ 349/123

FOREIGN PATENT DOCUMENTS

| JP | 4-371925 | 12/1992 |
| JP | 9-61827 | 3/1997 |
| JP | 10-319377 | 12/1998 |
| JP | 2000-019530 | 1/2000 |
| JP | 2000-137228 | 5/2000 |

OTHER PUBLICATIONS

D. K. Owens, "Estimation of the Surface Free Energy of Polymers," Journal of Applied Polymer Science, vol. 13, pp. 1741–1717 (1969).

* cited by examiner

Primary Examiner—Toan Ton
Assistant Examiner—Timothy Rude
(74) Attorney, Agent, or Firm—Finnegan, Henderson, Farabow, Garrett & Dunner, L.L.P.

(57) ABSTRACT

There is a liquid crystal display element capable of obtaining a good display performance which is not influenced by the deterioration with the time course and the history of applied voltage. The liquid crystal display element comprises: a first electrode substrate having a first transparent substrate, a first electrode formed on the first substrate, and a first alignment layer formed on the first substrate so as to cover the first electrode; a second electrode substrate having a second transparent substrate, a second electrode formed on the second substrate, and a second alignment layer formed on the second substrate so as to cover the second electrode; and a light modulating layer of an anti-ferroelectric liquid crystal material which is sandwiched between the first and second electrode substrates covered with alignment layers and which has a thresholdless voltage-transmittance characteristic, wherein the first and second alignment layers are combined with the liquid crystal material so that a shifted angle between the optical axis $\theta_B$ and an optical axis $\theta_{OA}$ of a batonnet is within ±1 degree.

7 Claims, 7 Drawing Sheets

$|\theta_{OA} - \theta_B| \leq 1°$

CROSS SECTION TAKEN ALONG LINE A-A'

ALIGNMENT LAYERS, CONTACT ANGLES, EXTENDING DIRECTIONS AND OPTICAL AXES OF BATONNET
(ANGLES SHIFTED FROM RUBBING DIRECTION)

| STRUCTURES OF PRINCIPAL CHAIN | | (1) | | | | (2) | | | | |
|---|---|---|---|---|---|---|---|---|---|---|
| ALIGNMENT LAYER MATERIAL | | A | A+B (2:1) | A+B (1:2) | B | C | D | D+E (2:1) | D+E (1:2) | E | F |
| SIDE CHAINS | | NONE | PRESENCE | PRESENCE | PRESENCE | NONE | PRESENCE | PRESENCE | PRESENCE | PRESENCE | PRESENCE |
| PRETILT ANGLES IN NEMATIC LIQUID CRYSTAL [°] | | 1-2 | | | 3 | 1-2 | 3-4 | | | 6-9 | 90 |
| CONTACT ANGLES [°] | (H2O) | 30.0 | 30.4 | 31.3 | 31.2 | 25.4 | 26.3 | 27.0 | 28.7 | 30.2 | 30.4 |
| | (CH2I2) | 4.2 | 5.4 | 7.5 | 10.5 | 5.4 | 6.2 | 7.6 | 10.1 | 11.5 | 12.4 |
| ① SURFACE TENSION [dyn/cm] | | 51.2 | 50.8 | 49.7 | 48.8 | 54.0 | 53.1 | 52.2 | 50.1 | 48.5 | 48.0 |
| ② EXTENDING DIRECTION [°] (OPTICAL AXIS [°] OF BATONNET) | a(Ps=210) | 5(5) | -(-) | -(-) | 7(7) | 0(7) | 8(8) | -(-) | -(-) | -(-) | -(-) |
| | b(160) | 5(5) | -(-) | -(-) | 5(5) | 2(7) | 5(7) | -(-) | -(-) | -(7) | -(-) |
| | c(30) | -3(-3) | -(-) | -(-) | -4(-4) | -4(-3) | -3(-4) | -(-) | -(-) | -(-) | -(-) |
| ③ ALIGNMENT CHARACTERISTICS | a(Ps=210) | ◎ | - | - | ○ | △ | ○ | - | - | △ | ※ |
| | b(160) | ◎ | - | - | × | × | △ | - | - | × | ※ |
| | c(30) | △ | ○ | ○ | △ | ○ | ○ | ○ | ◎ | × | ※ |
| ④ DETERIORATION RATIOS | c(30) | 1.7 | 1.6 | 1.8 | 2.0 | 4.2 | 1.9 | 1.8 | 1.2 | 1.5 | - |

FIG.3

LIQUID CRYSTAL DISPLAY ELEMENT

CROSS REFERENCE TO RELATED APPLICATION

This application claims benefit of priority under 35USC §119 to Japanese Patent Application No. H11-369363, filed on Dec. 27, 1999, the contents of which are incorporated by reference herein.

BACKGROUND OF THE INVENTION

1. Field of the Invention

The present invention relates to a liquid crystal display element.

2. Description of Related Art

Smectic liquid crystal materials having spontaneous polarization, such as ferroelectric liquid crystals and anti-ferroelectric liquid crystals, are expected as materials of next-generation liquid crystal display elements, since these materials have characteristics, such as rapid response and wide viewing angles, in a surface stabilized display mode. Particularly in recent years, it has been attempted to provide various moving picture displays which are combined with an active matrix driving system. As materials which are suitable for this use and which have no hysteresis, thresholdless anti-ferroelectric liquid crystals (which will be also hereinafter referred to as "TLAF liquid crystals") and polymer stabilized ferroelectric liquid crystals (which will be also hereinafter referred to as "PS-FLC liquid crystals") are widely noticed.

However, as one of the features of liquid crystal display elements which use liquid crystal materials having spontaneous polarization, there is the difficulty of controlling alignment or orientation. The TLAF liquid crystals have a phase series of Iso phase→SA phase→SC* phase (TLAF phase) in that order from a high temperature side. When a phase transition from Iso phase to SA phase occurs, a layer structure is formed, and when a phase transition from SA phase to SC* phase occurs, a chevron structure wherein the variation in spacing between smectic layers cause the layers to be bent is produced (see FIGS. 8(a) and 8(b)). The chevron structure is divided into two kinds of C1 and C2 alignments in accordance with the relationship between a bent direction and a pretilt angle (see FIG. 8(b)). The liquid crystal display element using the TLAF liquid crystal preferably has C2 alignment in view of display characteristics. If a rib structure and a rubbing system are selected (see, e.g., Japanese Patent Application No. 10-184903 filed by the applicant) and if an alternating electric field is applied during a slow cooling from Iso phase to SC* phase, it is possible to selectively obtain uniform C2 alignment. However, it was revealed that the same C2 alignment has different alignment characteristics in accordance with the kind of alignment layers.

In an ideal TLAF liquid crystal, an average optical axis during the application of a voltage of 0 V is coincident with the normal direction of a smectic layer. When the TLAF liquid crystal is used as a display element, homogeneously aligned TLAF panel is placed between crossed polarizers the axis of which are parallel and perpendicular to the smectic layer normal (crossed polarizers configuration). In this case, there is obtained a voltage-transmittance characteristic shown in FIG. 9, wherein black is displayed when a voltage of 0 V is applied and gray scale to white is displayed when a positive or negative voltage is applied.

However, some kinds of used alignment layers produce a phenomenon that a domain, which has a stripe shape parallel to the direction of the smectic layer and which has a deviated optical axis from layer normal, is produced to grow in the course of time and/or to increase the shift of the optical axis. It was observed that some kinds of liquid crystal materials promoted the same phenomenon when a high voltage approximating a saturation voltage was applied. Examples of observed alignment deterioration are shown in the schematic diagrams of FIGS. 10A, 10B and 10C. FIG. 10A is a diagram viewed from the surface of a substrate. The alignment layers provided on both substrates for sandwiching a liquid crystal, which are rubbed at predetermined angles, and a TLAF liquid crystal material is introduced between the substrates, so that a smectic layer structure shown in the figure is formed. The rubbing angle is determined by the combination of the used liquid crystals and alignment layers. The initial alignment state of the liquid crystal display element thus formed, and the alignment, in which the domain having the partially deviated optical axis was produced, were observed by a microscope having the crossed polarizers configuration. The observed results are shown in FIGS. 10B and 10C, respectively.

In order to facilitate understanding, the polarizing direction of a polarizer or analyzer is shifted from the normal direction of a smectic layer by x° (<22.5°) as shown in FIG. 10D.

In an alignment wherein no alignment deterioration occurs, the optical axis is one direction as shown in FIG. 10B, so that light uniformly transmits to be visible. However, in an alignment after deterioration wherein a domain having an optical axis deviated by ±x° is produced, it is observed that a domain having an optical axis coincident with the polarizing direction is dark, and a domain having an optical axis deviated in the opposite direction is bright, in a uniform alignment as shown in FIG. 10C. If the optical axis is thus deviated, it is not possible to obtain a satisfied black level, so that it is required to completely inhibit the optical axis from being deviated from the layer normal direction as a display element.

As way of inhibiting the optical axis from being deviated, Japanese Patent Laid-Open No. 10-319377 has proposed a method for introducing a polymer precursor into a TLAF liquid crystal material, injecting them between substrates, and photopolymerizing them in SA phase to stabilize the structure when a voltage of 0 V is applied.

However, the inventors studied and verified that according to the method for introducing the polymer precursor as disclosed in Japanese Patent Laid-Open No. 10-319377, the alignment itself of the TLAF liquid crystal is disturbed by foreign molecules other than the liquid crystal material, to increase the leakage of light during a black level independent of polymerization methods, so that contrast lowers.

SUMMARY OF THE INVENTION

It is therefore an object of the present invention to eliminate the aforementioned problems and to provide a liquid crystal display element having a good display performance, which is not influenced by the deterioration with the time course and the history of applied voltage.

In order to accomplish the aforementioned and other objects, according to one aspect of the present invention, a liquid crystal display element comprises: a first electrode substrate having a first transparent substrate, a first electrode formed on the first substrate, and a first alignment layer formed on the first substrate so as to cover the first electrode; a second electrode substrate having a second transparent substrate, a second electrode formed on the second substrate, and a second alignment layer formed on the second substrate so as to cover the second electrode; and a light modulating layer of an anti-ferroelectric liquid crystal material which is sandwiched between the first and second electrode substrates and which has a thresholdless voltage-transmittance characteristic, wherein the first and second alignment layers are combined with the liquid crystal material so that a deviated angle between the extending direction and optical axis of a batonnet is within ±1 degree.

Preferably, the optical axis of a batonnet deposited from the first electrode substrate is substantially coincident with the optical axis of a batonnet deposited from the second electrode substrate.

Preferably, the first and second alignment layers have a surface tension of 49 dyn/cm to 53 dyn/cm.

The first electrode substrate may be an array substrate comprising: a plurality of scanning lines and signal lines, which are provided on the first substrate in the form of a matrix; switching elements, each of which is formed at a corresponding one of the intersections between the scanning lines and the signal lines, one end of each of the switching elements being connected to a corresponding one of the signal lines, each of the switching elements being open and closed in response to a signal of a corresponding one of the scanning lines; pixel electrodes, each of which is connected to the other end of a corresponding one of the switching elements; and the first alignment layer formed on the first substrate so as to cover the pixel electrodes, and the second electrode substrate may be a counter substrate comprising a counter electrode formed on the second substrate, and the second alignment layer formed on the second substrate so as to cover the counter substrate.

BRIEF DESCRIPTION OF THE DRAWINGS

The present invention will be understood more fully from the detailed description given here below and from the accompanying drawings of the preferred embodiments of the invention. However, the drawings are not intended to imply limitation of the invention to a specific embodiment, but are for explanation and understanding only.

In the drawings:

FIG. 3 is a table showing the results of an experiment, which was carried out in order to obtain a liquid crystal display element according to the present invention;

DESCRIPTION OF THE PREFERRED EMBODIMENTS

Before describing the preferred embodiments of the present invention, how the present invention has been made will be described below.

As described about the prior art, a liquid crystal display element using a thresholdless anti-ferroelectric liquid crystal (which will be hereinafter referred to as a "TLAF liquid crystal") preferably has C2 alignment in view of display characteristics. However, it has been revealed that the same C2 alignment has different alignment characteristics in accordance with the kind of alignment layers.

Therefore, the inventors considered that there was the optimum combination of alignment layer materials with TLAF liquid crystal materials, and studied the following four points with respect to various TLAF liquid crystal materials and alignment layer materials.

① Surface Tension (Measured By Contact Angle Method)
② Observation Of Smectic Layer Forming Process (Particularly, Batonnet Depositing Process)
③ Initial Alignment Characteristic
④ Deterioration Ratio.

The surface tension (①) ($\gamma s$) was calculated from a contact angle, which was measured using pure water and methylene iodide, with respect to an alignment layer which was deposited on the same rubbing conditions as those during the preparation of a panel so as to have the same thickness as that during the preparation of the panel and for which the same heat process as a panel sealing process for sealing top and bottom substrates constituting cells of a display element was carried out. The calculation was carried out in accordance with Owens's method (D. K. Owens et al., J. Appl. Polym. Sci., 13, 1741 (1969)), and $\gamma s$ was obtained as the sum of a polarity force component ($\gamma sp$) and a dispersion force component ($\gamma sd$).

Figure 6:
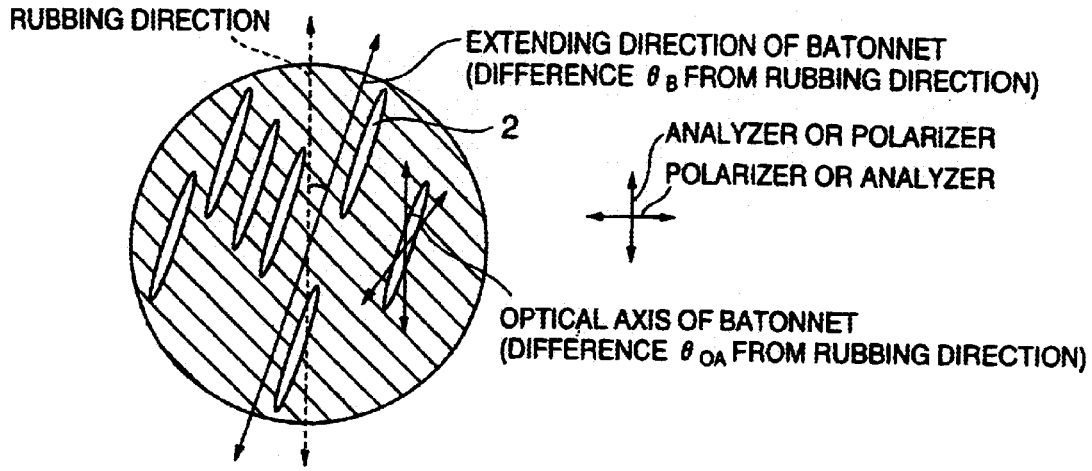
FIG. 6 is a schematic diagram showing the extending direction and optical axis of a batonnet which is observed by a polarizing microscope wherein crossed polarizers configuration.

The batonnet (②) is a name of SA phase deposited in Iso phase at near an Iso/SA phase transition temperature, and it has been known that the batonnet is deposited from the interface of an alignment layer, to which a force which induce the molecule to align parallel to the rubbing direction is applied in a cooling process from Iso phase. Since SA phase (having anisotropy) is deposited in isotropic Iso phase, if a polarizing microscope having the crossed polarizers configuration is arranged so that the axis of a polarizer or analyzer is shifted from the axis of the uniaxial optical anisotropy (=optical axis) of SA phase, the batonnet can be easily observed because a polarized component which be able to pass through the analyzer is produced so that only light passing through the SA phase portion (batonnet, 2), of linearly polarized light having passed through the polarizer (see FIG. 6). Typically, the batonnet has a rod shape. Here in after, the longitudinal direction of the batonnet is defined as an extending direction. If the axis of the uniaxial optical anisotropy is caused to be coincident with one of the polarizing axes of the polarizer, i.e., if the polarizing direction of linearly polarized light is caused to be coincident with the optical axis of the SA phase, the polarized component capable of passing through the analyzer is not produced. For that reason, no batonnet is observed by the microscope. This is the same if the axis of the uniaxial optical anisotropy is caused to be coincident with the polarizing axis of the analyzer. The axis of the uniaxial optical anisotropy of the batonnet is determined as a direction in which no batonnet is observed by a microscope having the crossed polarizers configuration. Throughout the specification, the extending directions and optical axis are defined by an angle shifted from a rubbing direction, and it is defined that the clockwise angle shifted from the rubbing direction has plus and the counterclockwise angle shifted from the rubbing direction has minus.

In the observation of a batonnet depositing process for obtaining extending directions and optical axis, a cell, only one side of which had an aligning force, i.e., a cell, only the alignment layer on one side of which had been rubbed, was used. Because, if the alignment layers on both sides are rubbed, batonnets deposited from the alignment layers on both sides are mixed, so that it is not possible to determine the sign of the shifted angle. The gap of the cell was 2 μm.

Figure 7:
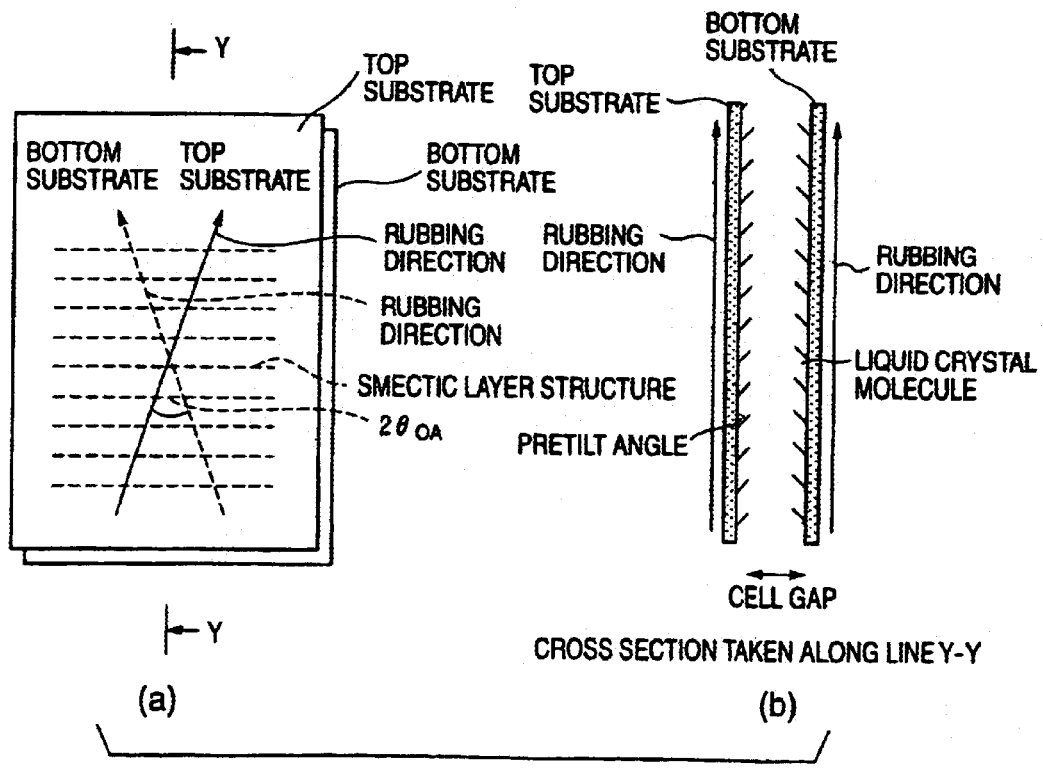
FIG. 7 is a schematic diagram showing a rubbing direction and a formed smectic layer structure.
Figure 8:
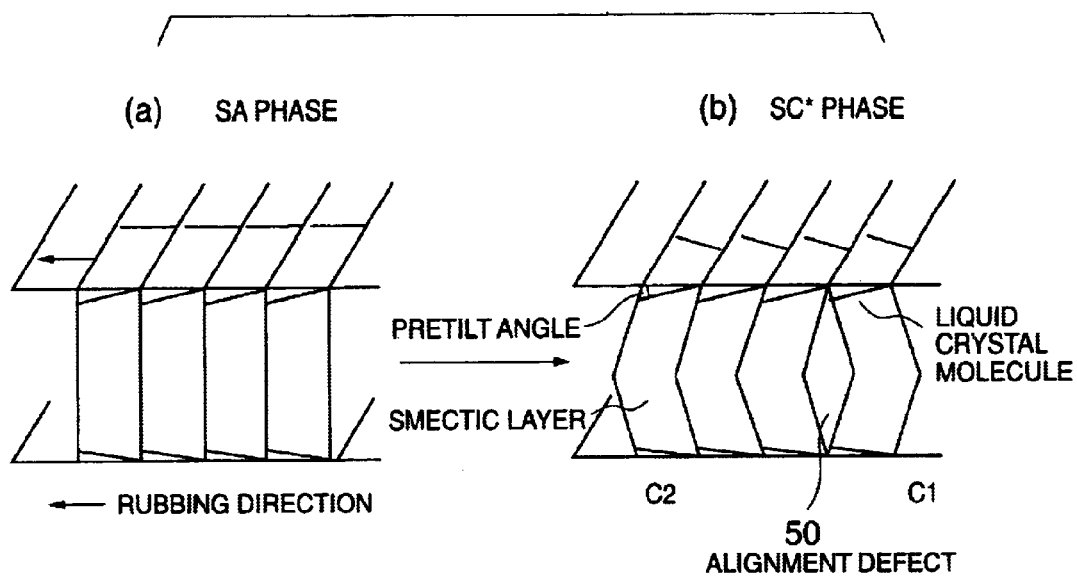
FIG. 8 is a schematic diagram showing the phase transition and variation in layer structure of a TLAF liquid crystal material.
Figure 9:
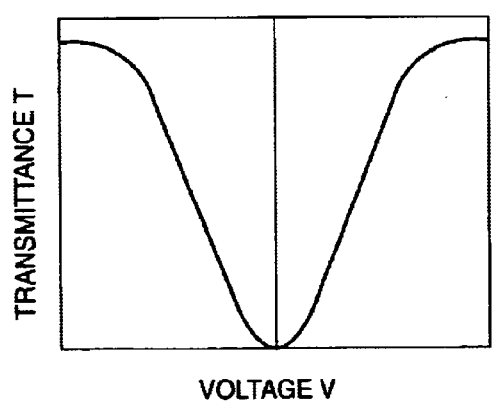
FIG. 9 is a graph showing the relationship between the voltage and transmittance of a TLAF liquid crystal material.
Figure 10A:
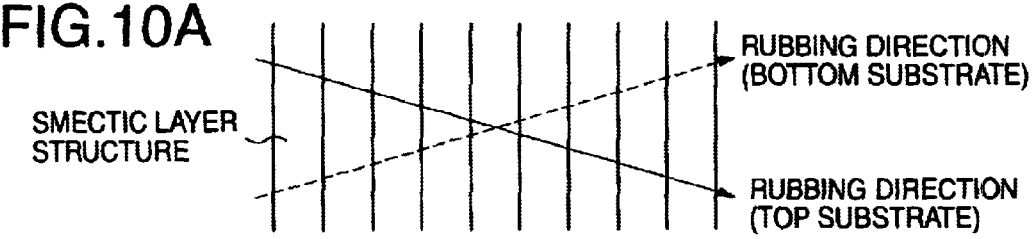
FIGS. 10A through 10D are illustrations for explaining conventional problems.
Figure 10B:
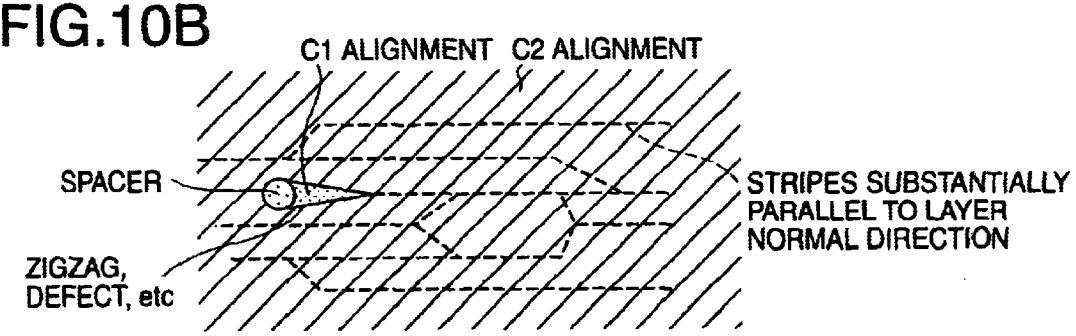
Figure 10C:
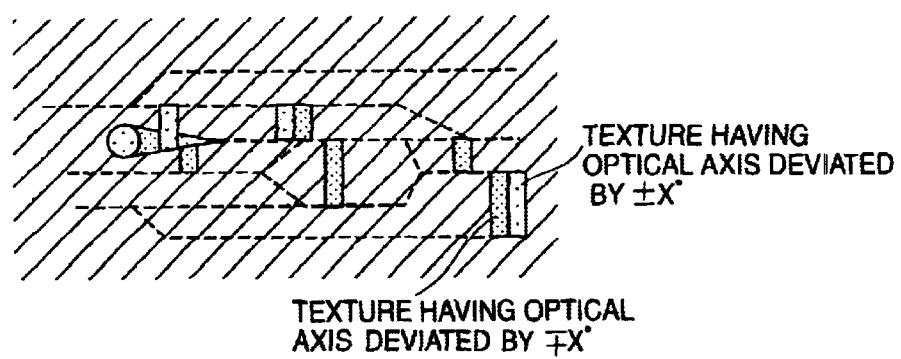
Figure 10D:
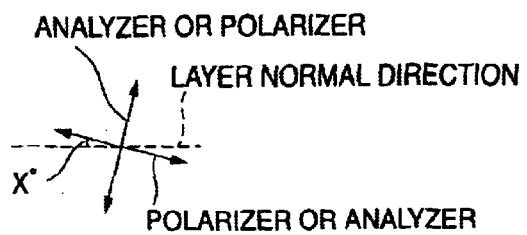

The initial alignment characteristic (③) and the deterioration ratio (④) were observed by a panel wherein a substantially parallel rubbing (cross rubbing) process shifted in a direction, in which the shifted angle $\theta_{OA}$ determined by ② between the rubbing direction and the optical axis of the battonnet was canceled, was carried out (see FIG. 7). Because it was verified by the inventor's observation that the normal direction of a finally obtained layer structure (a layer structure in SC* phase) was coincident with the optical axis of the batonnet deposited at near the Iso/SA phase transition temperature. By this cross rubbing, the normal directions induced from both of the alignment layers can be caused to be coincident with each other. On the other hand, if the rubbing directions are set to be anti-parallel directions, two kinds of chevron structures (C1, C2) having different bent directions shown in FIG. 8(b) are produced by 50%, so that it is not possible to produce only C2. It has been revealed from the inventor's study that the boundary portion 50 of this domain serves as an alignment defect to cause light leakage.

With respect to six kinds of alignment layer materials A through F of polyimide, pretilt angles in a nematic liquid crystal measured by the maker which produced these alignment layer materials, surface tensions measured by the inventors, and batonnet and initial alignment characteristics measured by the inventors with respect to the combinations with three kinds of TLAF liquid crystal materials a, b and c having different spontaneous polarization Ps values, are shown in FIG. 3. With respect to the liquid crystal material c, deterioration factors are also shown. In FIG. 3, in items with respect to the presence of side chains, "none" is shown with respect to alignment layer materials having only one principal chain and no side chain, and "presence" is shown with respect to alignment layer materials having side chains. The pretilt angle is a value measured by the maker, and the contact angle is a value measured within 24 hours after the thin-film deposition. The extending direction and optical axis of the batonnet is defined by an angle shifted from the rubbing direction. The clockwise angle shifted toward the surface of the alignment layer is shown by plus, and the counterclockwise angle shifted toward the surface of the alignment layer is shown by minus. With respect to the alignment characteristics, ⊙ is shown when optical axes are hardly deviated in areas, ○ is shown when optical axes are deviated in part of areas, Δ is shown when optical axes are remarkably deviated, and X is shown when optical axes are deviated in all of areas. Furthermore, ✕ shows fan-shaped structure, which observed when layer normal direction is indefinite, and "–" shows that no measurement was carried out. In addition, the deterioration ratio is a value obtained by dividing the amount of light leakage after deterioration by the amount of light leakage in the initial alignment, and "–" shows that no measurement was carried out.

The alignment layer materials A and B and the alignment layer materials C to F have the same principal chain structure. That is, the alignment layer material B is obtained by introducing side chains into the principal chain of the alignment layer material A, and the alignment layer materials D through F are obtained by introducing side chains into the principal chain of the alignment layer material C. The proportions of the side chains of the alignment layer materials D, E and F increase in that order. In general, hydrophobic side chains are introduced into alignment layer materials to decrease its surface tension, i.e., to increase its pretilt angle. This was supported by the measured surface tensions in polyimide series having the same principal chain structure.

Since it was suggested from the study of the alignment layer materials A through F that there was some possibility that the surface tension had the optimum value, alignment layer materials obtained by mixing the alignment layer materials A and B, or the alignment layer materials D and F in a proportion of one to two or two to one were studied using a TLAF liquid crystal material c for more detailed study.

As can be seen from the observed results shown in FIG. 3, there is caused a phenomenon that the extending direction $\theta_B$ and optical axis $\theta_{OA}$ of the batonnet are not coincident with each other. This was considered as follows. The extending direction (the angle $\theta_B$ shifted from the rubbing direction) of the batonnet shows the direction of the long axes of molecules near the surface of the alignment layer in which the batonnet is deposited. The optical axis (the angle $\theta_{OA}$ shifted from the rubbing direction) of the batonnet shows the average optical axes of molecules in the cell (bulk). The normal direction of the smectic layer on the SC* phase in a lower temperature region is coincident with the optical axis of the batonnet, and the layer structure of the SA phase is maintained even on the SC* phase, so that it can be seen that the layer normal direction on the SA phase was parallel to the optical axis. Therefore, $\theta_B \neq \theta_{OA}$ means that the molecular orientation is twisted in the direction of the cross section of the cell. This cause the alignment to be unstable in the case of TLAF alignment.

In the alignment layer C having a high surface tension and the TLAF liquid crystal materials a and b having large spontaneous polarization Ps, the difference between the extending direction and the optical axis of the batonnet was particularly remarkable. The reason for this can be explained that the electric interaction between the liquid crystal molecules and the alignment layer is larger to allow the molecular orientation to be easily twisted in the vicinity of the surface of the alignment layer.

As described above, in a TLAF liquid crystal display element, it is required to cause the layer normal directions of smectic layers induced from the surfaces of the alignment layers of both substrates to be coincident with each other when the substrates are rubbed. In order to cancel $\theta_{OA}$, not $\theta_B$, it is necessary to carry out a cross rubbing shifted by $2\theta_{OA}$ (see FIG. 7(a)).

In the alignment layer materials B, E and F, it was not possible a good initial alignment although the optical axis and extending direction of the batonnet were coincident with each other, but it was reveled that these alignment layer materials had a low surface tension. It is known that the pretilt angle of the alignment layer material having the low surface tension generally increases. In an alignment layer formed of such an alignment layer material having a low surface tension, it is expected that the normal direction of a smectic layer, which is substantially parallel to the long axes of molecules when the smectic layer is formed on SA phase, is not parallel to the surface of the alignment layer. Such turbulence of the layer structure cause the alignment to be unstable. In a liquid crystal display element actually prepared using the alignment layer material F, a fan-shaped structure, which is to be produced when the layer is not regulated, was observed.

From the above results, it was revealed that the layer normal direction of the smectic layer can not be controlled so as to be parallel to the substrate since the pretilt angle is high when the surface tension is low and that the twist of the molecular orientation is induced near the surface of the alignment layer since the electric interaction between the alignment layer and liquid crystal molecules is strong when the surface tension is high. Since both cause the alignment of the TLAF liquid crystal to be unstable, it is considered that the surface tension has the optimum value.

Figure 4:
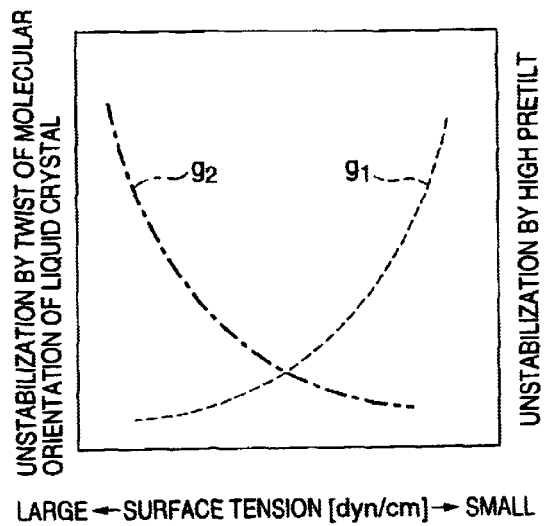
FIG. 4 is a graph for explaining that the surface tension of an alignment layer has an optimum range.

For example, as shown in graph $g_1$ of FIG. 4, the instability due to the high pretilt increases as the surface tension of the alignment layer decreases, and as shown in graph $g_2$ of FIG. 4, the instability due to the twist of the molecular orientation near the surface of the alignment layer increases as the surface tension of the alignment layer increases. It is therefore considered that the optimum surface tension exists in order to inhibit these instabilities.

Therefore, with respect to the combinations of alignment layers formed of the alignment layer materials A through F with the liquid crystal materials a through c, surface tensions and initial alignment characteristics are shown in FIG. 3. The initial alignment characteristics were evaluated in a proportion in which a domain having a deviated optical axis was produced. The deterioration ratio of the liquid crystal material c was also measured. The deterioration ratio is a value obtained by dividing the amount of light leakage after the deterioration of the alignment by the amount of light leakage in the initial alignment. The deterioration ratio is a value showing the stability of the alignment. However, if the initial alignment is bad, the denominator (the amount of light leakage in the initial alignment) increases, so that there are some cases where the deterioration ratio is apparently a low value. Therefore, the deterioration ratios were described together with the alignment characteristics.

Figure 5:
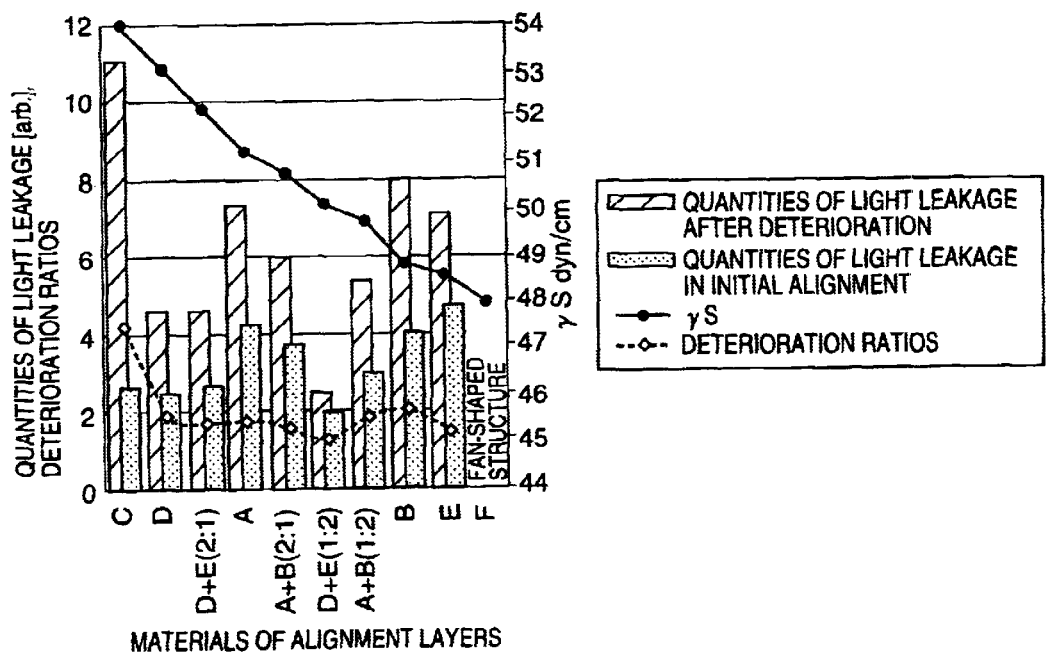
FIG. 5 is a graph showing the relationship between the surface tension of an alignment layer and a deterioration factor.

FIG. 5 is a graph wherein alignment layer materials are arranged on the axis of abscissas in order of surface tension, and wherein the axis of ordinates shows the amount of light leakage in the initial alignment, the amount of light leakage after deterioration and the deterioration ratio. The unit of the amount of light leakage is an arbitrary unit (arb.).

From the results shown in FIG. 5, if liquid crystal display elements having a deterioration ratio of 2 or less and maintaining the initial alignment characteristics as desired liquid crystal display elements are selected, liquid crystal display elements having alignment layers formed, except for the alignment layer materials B, C, E and F, remain. That is, it can be seen that the combinations of an alignment layer having a surface tension of 49 dyn/cm to 53 dyn/cm with a TLAF liquid crystal material provides a good alignment.

The reason why the liquid crystal display having the deterioration ratio of 2 or less is preferred is as follows.

The contrast (=light-transmission of white level/light transmission of black level) of a liquid crystal display element using a twisted nematic (TN) mode is generally in the range of from about 200 to about 300, and about 250 on average, although it varies in accordance with measuring methods. In liquid crystal display elements having a birefringence mode, which includes TLAF liquid crystals, light transmission I is in proportion to $\sin^2 2\theta$ assuming that the tilt angle is $\theta$. The tilt angle $\theta$ of the TLAF liquid crystal is about 30 degrees. Therefore, in the TLAF liquid crystal, the light transmission is about 75% of an ideal value (when $\theta=45$ degrees). Because the inventors considered that the contrast of 100 or less is insufficient for transmission display elements and that it is not allowed that the light transmission of black level exceeds double, i.e., the deteriorate ratio exceeds 2.

There is preferably no difference between the extending direction $\theta_B$ and the optical axis $\theta_{OA}$ of the batonnet in order to inhibit the instability due to the twist of the liquid crystal molecular orientation. As described above, the alignment layer material D has a surface tension of 53.1 dyn/cm which is slightly beyond the desired range of surface tension according to the present invention (the range of from 49 dyn/cm to 53 dyn/cm). In the combination of this alignment layer material with the liquid crystal material a, the extending direction $\theta_B$ of the batonnet was equal to the optical axis $\theta_{OA}$ thereof, so that the initial alignment was ○, i.e., the optical axis was only partially deviated. On the other hand, in the combination of the alignment layer material D with the liquid crystal material b, the difference $|\theta_B-\theta_{OA}|$ between the extending direction $\theta_B$ (=5 degrees) and optical axis $\theta_{OA}$ (=7 degrees) of the batonnet was 2 degrees, so that the evaluation of the initial alignment was Δ, i.e., the deviation of optical axes of domains were remarkable. In the combination of the alignment layer material D with the liquid crystal material c, the difference $|\theta_B-\theta_{OA}|$ between the extending direction $\theta_B$ (=−3 degrees) and optical axis $\theta_{OA}$ (=−4 degrees) of the batonnet was 1 degree, so that the evaluation of the initial alignment was ○, i.e., the optical axes of domains were only partially deviated. Therefore, although the extending direction $\theta_B$ of the batonnet is preferably equal to the optical axis $\theta_{OA}$ thereof, an initial alignment is given so that the optical axis is only partially shifted when the difference is 1 degree or less even if the optical axis is shifted.

From the above results, it was found that alignment layer materials having the following characteristic (i) and combinations of alignment layer materials having the following characteristic (ii) with TLAF materials provide a good alignment.

(i) The difference between the extending direction and the optical axis of a batonnet is within ±1 degree.

(ii) An alignment layer has a surface tension of 49 dyn/cm to 53 dyn/cm.

If a liquid crystal material and alignment layer suiting these conditions are used and if top and bottom substrates are combined to prepare a panel so that the optical axis of a batonnet deposited from the top substrate is coincident with the optical axis of a batonnet deposited from the bottom substrate, it is possible to realize a thresholdless antiferroelectric liquid crystal display element having excellent alignment characteristics. Thus, it is possible to obtain a good display performance. In addition, any impurities other than the liquid crystal material are not mixed with the liquid crystal material, so that the alignment characteristics are not disturbed by the impurities.

Figure 1:
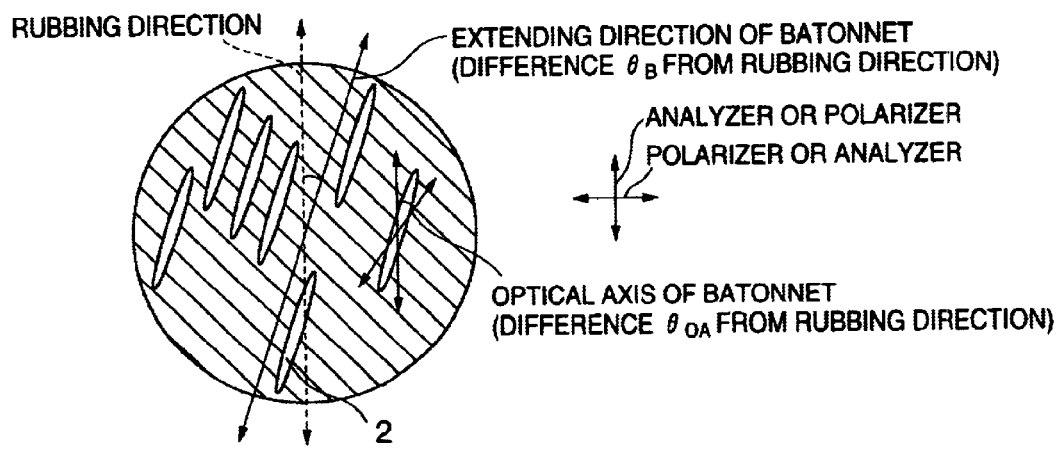
FIG. 1 is an illustration for explaining the feature of a preferred embodiment of a liquid crystal display element according to the present invention.

Referring now to the accompanying drawings, particularly to FIGS. 1, 2A and 2B, a preferred embodiment of a liquid crystal display element according to the present invention will be described below.

In this preferred embodiment, a liquid crystal display element is an active matrix driving liquid crystal display element using a light modulating layer of a thresholdless anti-ferroelectric liquid crystal material. As shown in FIG. 1, the liquid crystal display element is formed so that the difference between the extending direction $\theta_B$ and the optical axis $\theta_{OA}$ of a batonnet 2 is within ±1 degree. FIG. 1 is a schematic diagram showing the extending direction and the optical axis of a batonnet observed by a polarizing microscope which has polarizers arranged in the crossed polarizers configuration.

Figure 2A:
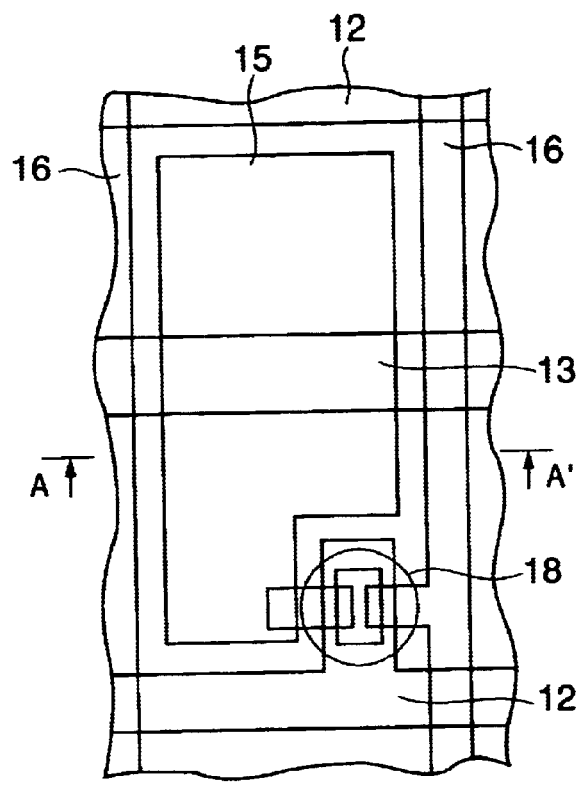
FIG. 2A is a plan view showing the construction of the active matrix driving liquid crystal display element.
Figure 2B:
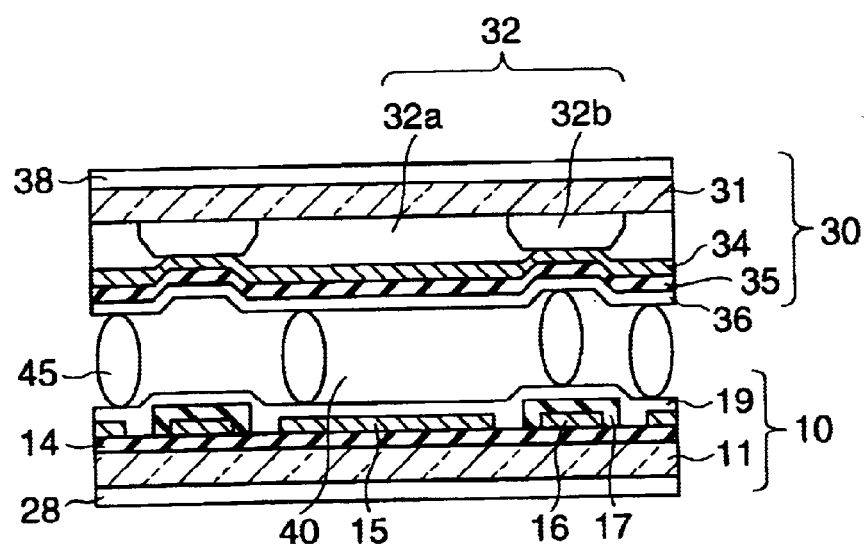
FIG. 2B is a sectional view showing the construction of an active matrix driving liquid crystal display element.

Referring to FIGS. 2A and 2B, the construction of the active matrix driving liquid crystal display element in this preferred embodiment will be described below.

FIG. 2A is a plan view of the active matrix driving liquid crystal element in this preferred embodiment, and FIG. 2B is a sectional view taken along line A–A' of FIG. 2A.

As shown in FIGS. 2A and 2B, the liquid crystal display element in this preferred embodiment comprises an array substrate 10, a counter substrate 30, and a light modulating layer 40 which is sandwiched between the substrates so as to have a predetermined thickness by spacer balls 45 and which is made of an anti-ferroelectric liquid crystal material having a thresholdless voltage-transmittance characteristic.

As shown in FIG. 2B, the array substrate 10 has a transparent insulating substrate 11. On the major surface of the substrate 11, a plurality of scanning lines 12 and storage capacitive lines 13 extending in one direction are formed. In addition, a transparent insulating layer 14 is formed on the major surface of the substrate 11 so as to cover the scanning lines 12 and the storage capacitive lines 13. On the insulating layer 14, a plurality of pixel electrodes 15 of ITO are formed, and a plurality of signal lines 16 are formed so as to be substantially perpendicular to the scanning lines 12 (see FIGS. 2A and 2B). The signal lines 16 are covered with an insulating film 17 (see FIG. 2B). On the major surface of the substrate 11 near each of the intersections between the scanning lines 12 and the signal lines 16, a switching element 18 of TFT is formed. The gate of the switching element 18 is connected to a corresponding one of the scanning lines 12. One terminal of the source and drain of the switching element 18 is connected to a corresponding one of the signal lines 16 via a contact (not shown) provided in the insulating film 17, and the other terminal is connected to a corresponding one of the pixel electrodes 15.

On the major surface of the substrate 11, an alignment layer 19 is formed so as to cover the pixel electrodes 15 and the switching elements 18. On the reverse surface of the substrate 11, a polarizing plate 28 is formed.

On the other hand, the counter substrate 30 is provided with a color filter part 32 which comprises a color part 32a, formed in a pixel region on the major surface of a transparent insulating substrate 31, for allowing light having specific wavelengths to pass therethrough, and a black matrix 32b formed in a non pixel region. On the display region of the color filter part 32, a counter electrode 34 of ITO is formed. On the counter electrode 34, an alignment layer 36 is formed via an inorganic insulating film 35. The inorganic insulating film 35 is preferably provided for maintaining insulation. On the reverse surface of the substrate 31, a polarizing plate 38 is formed.

The optical axis of the polarizing plate 28 of the array substrate 10 and the optical axis of the polarizing plate 38 of the counter substrate 30 are arranged in the crossed polarizers configuration.

In this preferred embodiment, the alignment layers 19 and 36 are formed of the alignment layer material A shown in FIG. 3 so as to have a thickness of 43 nm. The alignment layers 19 and 36 have been rubbed in a direction, which is substantially parallel to a direction shifted from the normal direction of a smectic layer constituting the light modulating layer 40 counterclockwise by 5 degrees, toward the surface of each of the alignment layers. A cross rubbing has been carried out so that the rubbing direction of the array substrate 10 is different from that of the counter substrate 30 by 10 degrees (=$2\theta_{OA}$) as shown in FIG. 7. The surface tension of each of the alignment layers 19 and 36 after the rubbing process was 51.2 dyn/cm.

The panel alignment of the array substrate 10 with the counter substrate 30 is carried out by a sealing material, which is applied on the non display region, so that the alignment layers 19 and 36 face each other, except for an injection port (not shown) and an exhaust port (not shown).

In this preferred embodiment, the thresholdless anti-ferroelectric liquid crystal material b shown in FIG. 3 was used as the liquid crystal material constituting the light modulating layer 40. The phase series of this liquid crystal material comprises Iso (82° C.), SA (62° C.) and SC*.

This liquid crystal material is introduced after an injection process in which the liquid crystal material is introduced from the injection port while exhausting from the exhaust port. After the liquid crystal material is injected, the injection and the exhaust ports are completely sealed by a sealing material (not shown) to be insulated from outside air. After the panel filled with the liquid crystal material b was heated once to 85° C. at which Iso phase is formed, it was cooled slowly at a rate of −2° C./min to 30° C. As a result, the optical axis of batonnet deposited from the surface of each of the alignment layers is substantially coincident with each other at near the Iso/SA phase transition temperature in the substantially intermediate between the above described rubbing directions, and a uniform smectic layer structure having a layer normal direction coincident with the optical axis was formed in an SC* layer. The polarizing direction of one of the polarizing plates 28 and 38 arranged in the crossed polarizers configuration is arranged so as to be coincident with the layer normal direction.

After the alignment state of this liquid crystal display element was observed, it was revealed that the alignment state was C2 alignment except for minor alignment defects produced in the vicinity of the spacer balls, from the shape of the alignment defects and the rubbing directions, and that the optical axis was coincident with the layer normal direction. The contrast of the liquid crystal display element, i.e., the ratio of the maximum light transmission to the minimum light transmission, was about 180, so that a sufficient contrast was achieved. It was verified that the contrast was maintained to be 100 or higher even after 500 hours.

In order to improve the performance of liquid crystal display elements in this preferred embodiment, liquid crystal display elements in the following comparative examples 1, 2 and 3 were prepared, and the performance thereof was examined. The results thereof will be described below.

COMPARATIVE EXAMPLE 1

A cell of a liquid crystal display element was prepared in the same structure as that in the preferred embodiment, except that the alignment layers 19 and 36 were formed of the alignment layer material C shown in FIG. 3 so as to have a thickness of 37 nm and that a cross rubbing was carried out in parallel directions at 7 degrees clockwise and counterclockwise toward the surface of the alignment layers and at ±7 degrees ($2\theta_{OA}$=14 degrees) on the array and counter substrates, and a liquid crystal display element filled with the thresholdless anti-ferroelectric liquid crystal material b shown in FIG. 3 was prepared. In this comparative example 1, the surface tension of the alignment layer after the rubbing was 54.0 dyn/cm.

After the liquid crystal display element in this comparative example 1 was heated once to 85° C. at which Iso phase is formed, it was cooled slowly at a rate of −2° C./min to 30° C. As a result, although it was observed that the extending direction and the optical axis of a batonnet were shifted from each other, the optical axes of the batonnet were substantially coincident with each other in the substantially intermediate between the above described rubbing directions to obtain a smectic layer structure wherein the layer normal direction and the optical axis in SC* layer at room temperatures are substantially arranged in the intermediate between the rubbing directions. From the shape of minor alignment defects produced in the vicinity of the spacer balls and the rubbing directions, it was also found that the alignment state was C2 alignment except for the alignment defects. However, after the alignment state of this cell was observed after 1 hour, domains having optical axes deviated from the layer normal direction by ±14 degrees were produced. Although the initial value of the contrast of this liquid crystal display element reached to about 180, the black level was increased by the production of the domains having the optical axes deviated from the transmission axis of the polarizing plate, so that the contrast was lowered to 50 or less after 24 hours.

COMPARATIVE EXAMPLE 2

A cell of a liquid crystal display element was prepared in the same structure as that in the preferred embodiment, except that the alignment layers 19 and 36 were formed of the alignment layer material E shown in FIG. 3 so as to have a thickness of 29 nm and that a cross rubbing was carried out in parallel directions at degrees clockwise and counterclockwise toward the surface of the alignment layers and at ±7 degrees ($2\theta_{OA}$=14 degrees) on the array and counter substrates, and a liquid crystal display element filled with the thresholdless anti-ferroelectric liquid crystal material b shown in FIG. 3 was prepared. The surface tension of the alignment layer after the rubbing was 48.5 dyn/cm.

The alignment state of this liquid crystal display element was examined. Although the alignment was C2 alignment except for minor alignment defects produced in the vicinity of the spacer balls, from the shape of the alignment defects and the rubbing directions, two kinds of domains having optical axes deviated from the layer normal direction by ±15 degrees on the whole area were formed. This alignment was not improved even if an alternating voltage is applied.

Since the optical axes of the liquid crystal display element in this comparative example 2 were not aligned with each other, the black level was not lowered, and the contrast was about 30.

COMPARATIVE EXAMPLE 3

Although the alignment layers 19 and 36 were formed of the alignment layer material F to prepare a one-side-rubbed liquid crystal display element for obtaining the optical axis of the batonnet, the optical axis of the batonnet was not determined to be one direction. Although the thresholdless anti-ferroelectric material b shown in FIG. 3 was used as the liquid crystal material, this thresholdless anti-ferroelectric material was not oriented, and the fan-shaped structure, which was produced when the smectic layer structure was not univocally determined, was observed. The surface tension of the alignment layer after the rubbing was 48.0 dyn/cm.

As described above, according to this preferred embodiment, the contrast is not influenced by the deterioration with the time course and the history of applied voltage, so that it is possible to obtain a good display performance.

As described above, according to the present invention, it is possible to obtain a good display performance which is not influenced by the deterioration with the time course and the history of applied voltage.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A liquid crystal display element comprising:
    a first electrode structure having a first transparent substrate, a first electrode formed on said first substrate, and a first rubbed alignment layer formed on said first substrate so as to cover said first electrode;
    a second electrode structure having a second transparent substrate, a second electrode formed on said second substrate, and a second rubbed alignment layer formed on said second substrate so as to cover said second electrode; and
    a light modulating layer of an anti-ferroelectric liquid crystal material which is sandwiched between said first and second electrode substrates covered with first and second rubbed alignment layers and which has a thresholdless voltage-transmittance characteristic,
    wherein said first and second alignment layers are combined with said liquid crystal material so that a shifted angle between the extending direction and an optical axis of a batonnet is within ±1 degree; and
    wherein said first and second rubbed alignment layers have a surface tension of 49 dyn/cm to 53 dyn/cm.

2. A liquid crystal display element as set forth in claim 1, wherein the optical axis of a batonnet deposited from said first electrode substrate is substantially coincident with the optical axis of a batonnet deposited from said second electrode substrate.

3. A liquid crystal display element as set forth in claim 2, wherein said first electrode substrate is an array substrate comprising: a plurality of scanning lines and signal lines, which are provided on said first substrate in the form of a matrix; switching elements, each of which is formed at a corresponding one of the intersections between said scanning lines and said signal lines, one end of each of said switching elements being connected to a corresponding one of said signal lines, each of said switching elements being open and closed in response to a signal of a corresponding one of said scanning lines; pixel electrodes, each of which is connected to the other end of a corresponding one of said switching elements; and said first alignment layer formed on said first substrate so as to cover said pixel electrodes, and
    said second electrode substrate is a counter substrate comprising a counter electrode formed on said second substrate, and said second alignment layer formed on said second substrate so as to cover said counter substrate.

4. A liquid crystal display element as set forth in claim 1, wherein said first electrode substrate is an array substrate comprising: a plurality of scanning lines and signal lines, which are provided on said first substrate in the form of a matrix; switching elements, each of which is formed at a corresponding one of the intersections between said scanning lines and said signal lines, one end of each of said switching elements being connected to a corresponding one of said signal lines, each of said switching elements being open and closed in response to a signal of a corresponding one of said scanning lines; pixel electrodes, each of which is connected to the other end of a corresponding one of said switching elements; and said first alignment layer formed on said first substrate so as to cover said pixel electrodes, and said second electrode substrate is a counter substrate comprising a counter electrode formed on said second substrate, and said second alignment layer formed on said second substrate so as to cover said counter substrate.

5. A liquid crystal display element comprising:

a first substrate including, a first electrode formed on said first substrate, and a first alignment layer wherein said first alignment layer covers said first electrode;

a second substrate including, a second electrode formed on said second substrate, and a second alignment layer wherein said second alignment layer covers said second electrode; and a light modulating layer of an anti-ferroelectric liquid crystal material between said first and second substrates and wherein said anti-ferroelectric liquid crystal material has a thresholdless voltage-transmittance characteristic, wherein said first and second alignment layers are combined with said liquid crystal material so an angle between an extending direction and an optical axis of a batonnet is within about ±1 degree; and wherein said first and second rubbed alignment layers have a surface tension of 49 dyn/cm to 53 dyn/cm.

6. The liquid crystal display element of claim 5, wherein the optical axis of a batonnet deposited from said first substrate is substantially coincident with the optical axis of a batonnet deposited from said second substrate.

7. A liquid crystal display element as set forth in claim 5 further comprising a plurality of scanning lines and signal lines, on said first substrate; switching elements of each of which is formed at a corresponding one of the intersections between said scanning lines and signal lines, one end of each of said switching elements being connected to a corresponding one of said signal lines; pixel electrodes, each of which is connected to the other end of a corresponding one of said switching elements; and said first alignment layer formed on said first substrate so as to cover said pixel electrodes, and said second electrode substrate is a counter substrate comprising a counter electrode formed on said second substrate, and said second alignment layer formed on said second substrate so as to cover said counter substrate.

* * * * *